United States Patent Office 3,525,683
Patented Aug. 25, 1970

3,525,683
SWEETENING OF JP-4 JET FUEL WITH AN ALKALI METAL PLUMBITE, PHTHALOCYANINE COMPOUND AND ELEMENTAL SULFUR
Kenneth L. Johnston and Dominic Fontana, Great Falls, Mont., assignors to Phillips Petroleum Company, a corporation of Delaware
No Drawing. Filed Mar. 21, 1968, Ser. No. 714,797
Int. Cl. C10g 19/06, 27/06, 29/02
U.S. Cl. 208—199                 2 Claims

ABSTRACT OF THE DISCLOSURE

Addition of a phthalocyanine compound to conventional "Doctor" solution results in a novel sweetening solution which permits extension of treating period for satisfactory sweetening of hydrocarbons prior to dumping or regeneration.

BACKGROUND OF THE INVENTION

The presence of appreciable quantities of mercaptans in distillate oils or components thereof, obtained from many crude oils, is undesirable due to their very objectionable odor. The odor of such petroleum fractions must be improved before they are suitable for marketing. The odor problem is improved either by removing the mercaptans from the oils or by converting them into substances having less odorous characteristics. One of the well known processes for converting these objectionable substances to less odorous compounds is the "Doctor" treatment. In this sweetening process, the sour petroleum fraction is treated with an aqueous solution of an alkali metal hydroxide containing sodium plumbite and elementary sulfur. The mercaptans are converted into disulfides, which have substantially no odor, and the resulting "Doctor" treated petroleum fraction exhibits a great improvement in odor.

While this "Doctor" treatment provides a satisfactory means for sweetening the petroleum fractions, it suffers from the disadvantage that for some petroleum fraction treatments there is required dumping of the "Doctor" solution or regeneration of the "Doctor" solution at such frequency to render the process economically unsatisfactorily.

THE PRESENT INVENTION

In accordance with the present invention, it has been found that the life of the conventional "Doctor" solution treating agent is extended by having from 10 to 1000 parts per million of a phthalocyanine compound therein.

Another object of this invention is to provide an improved process for sweetening petroleum oil fractions.

Another object of this invention is to provide a process for extending the life of the "Doctor" solution used in the sweetening of petroleum oil fractions.

Other aspects, objects, and the several advantages of this invention will be apparent from the following specification and claims.

This invention is directed to the use of the combination of a phthalocyanine compound with conventional "Doctor" solution for the "Doctor" treatment of petroleum fractions. The term "Doctor" treatment as employed herein refers to the conventional process for sweetening of hydrocarbons such as described in Petroleum Refiner, vol. 39, No. 9, September 1960, page 261, wherein "Doctor" solution, air and sulfur are utilized.

The amount of the phthalocyanine compound added to the "Doctor" solution is preferably in an amount in the range of 10 to 1000 parts by weight per million parts of "Doctor" solution. However, greater amounts can be added, if desired.

A temperature of about 50 to 230° F., preferably about 75 to 150° F., is used during the treatment of the oil with the "Doctor" solution containing the phthalocyanine compound. Other temperatures can be used, but temperatures lower than about 50 will require longer contact periods than are considered practical. A contact time of about one to ten minutes, preferably one to five minutes, is effective at temperatures of about 50 to 230° F. The method of contacting may be mechanical or by turbulent flow. The process of this invention may be conducted batchwise as well as continuously.

Ordinarily sufficient pressure is employed in the system to maintain the materials therein in a liquid state.

As hereinbefore set forth, the sweetening process is effected in the presence of phthalocyanine compound. Any suitable phthalocyanine catalyst may be used and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine, in general, is not readily soluble in aqueous solvent, and therefore, when used in an aqueous alkaline solution, a derivative of the phthalocyanine is preferred. A particularly preferred derivative is the sulfonated derivative. Thus, an especially preferred phthalocyanine catalyst is cobalt phthalocyanine sulfonate. Such a catalyst comprises cobalt, phthalocyanine disulfonate and also contains cobalt phthalocyanine monosulfonate. Another preferred catalyst comprises vanadium phthalocyanine sulfonate. These compounds may be obtained from any source or prepared in any suitable manner as, for example, by reacting cobalt or vanadium phthalocyanine with 25–50% fuming sulfuric acid. While this sulfonic acid derivatives are preferred, it is understood that other suitable derivatives may be employed.

The petroleum fractions can be treated successfully in accordance with this invention include those that contain mercaptans. Virgin and cracked petroleum fractions boiling in the range of approximately 250 to 700° F. are especially susceptible to treatment in accordance with this invention.

The present invention is also specially applicable to those petroleum fractions which are employed as fuel for jet engines.

Sodium plumbite solution, otherwise known as "Doctor" solution, as utilized in the present invention, is prepared by dissolving 125 parts by weight of sodium hydroxide in 1000 parts by weight of water. Thereafter, there is added 60 parts by weight of PbO and the resulting mixture agitated. The resulting mixture is there after filtered, or settled and decanted, and the liquid solution employed in the process as described. These quantities are not critical. "Doctor" solution can have, by weight percent, about 5 to 25 percent NaOH, 1 to 15 percent PbO, and the remainder being water.

Although sodium hydroxide is preferred in preparation of the "Doctor" solution because of its cheapness, other alkali metal hydroxides, such as potassium hydroxide or lithium hydroxide or any combinations of these three alkali metal hydroxides may be used. The caustic solution of this invention may be used repeatedly without the necessary of regeneration. However, in keeping with the concept of this invention, it is apparent that there will be ultimately either a complete or periodic withdrawal of a portion of the solution for regeneration and return to the system. However, since the addition of the cobalt phthalocyanine compound so effectively extends the life of the "Doctor" solution it is satisfactory to operate the system using the same solution until such time as the accumulation of materials therein necessitates discarding the solution or at least regeneration to achieve satisfactory treatment of the hydrocarbon.

In carrying out the imporved "Doctor" treatment process of this invention the treating solution, consisting of the conventional "Doctor" solution as described above and having a phthalocyanine compound therein, is charged to the treating zone in an amount sufficient to provide a volume ratio of reagent to hydrocarbon fraction being treated in the range of 1:30 to 2:1, and preferably in a ratio of 1:10.

In carrying out the sweetening process with the improved "Doctor" solution there is also added to the system, as previously indicated, sulfur and air.

The sulfur employed in carrying out the process is supplied in an amount in the range of 0.05 to 1 pound per pound of mercaptan sulfur (the sulfur content of the mercaptan) and preferably in the range of 0.10 to 0.50 pound per pound of mercaptan (measured as sulfur). Sulfur can be added as a solution in a portion of the hydrocarbon. The air is supplied generally in an amount sufficient to effect the desired oxidation—ordinarily the amount of air is in the range of 10 to 100 s.c.f. per secpound of mercaptan sulfur (the sulfur content of the mercaptan). Preferably air is introduced in an amount in the range of 15 to 60 s.c.f. (Standard Cubic Feet) per pound of mercaptan sulfur.

When treating hydrocarbons to eliminate "sourness" the ASTM tests which are run to determine whether or not the treated hydrocarbon passes the "sulfur" specification are ASTM D–130–56 "Copper Strip Corrosion" and ASTM D–484–52 "Standard Specifications for Stoddard Solvent"—"Doctor" Test. The copper strip test shows whether or not $H_2S$ and/or free-sulfur are present as corrosive materials in the hydrocarbon, and the "Doctor" test shows whether or nor mercaptan sulfur is present.

The following examples are introduced to illustrate further the novelty and utility of the present invention but not with the intention of unduly limiting the same.

EXAMPLE I

In a conventional "Doctor" sweetening system 150 barrels/hr. of sour JP–4 jet fuel, boiling between about 200 and 600° F. (ASTM distillation, 20% evap. 270° F., 50% evap. 360° F., 90% evap. 436° F.) were treated for 2.5 minutes (contact time) at 95° F. and a pressure of 25 p.s.i.g. (to insure liquid phase) with 15 barrels/hr. of a solution of sodium plumbite (a "Doctor" solution formed by mixing 10.5 wt. percent NaOH, 5.1 wt. percent PbO and 84.4 wt. percent $H_2O$) having 50 parts per million by weight (p.p.m.) of cobalt phthalocyamine disulfonate therein, 2.5 lbs/hr. sulfur and 120 std. cu. ft./hr. of air.

The following results were obtained:

| | Acceptable specification | Before treatment | Following treatment |
|---|---|---|---|
| ASTM distillation: | | | |
| 20% evap | 290° F. max | 270° F | 270° F. |
| 50% evap | 370° F. max | 360° F | 360° F. |
| 90% evap | 470° F. max | 436° F | 436° F. |
| API gravity | 45–57 | 51.1 | 51.1. |
| Reid vapor pressure | 2 to 3 | 2.3 | 2.3. |
| Copper strip corrosion [1] | Passes | Passes | Passes. |
| Doctor test [2] | Negative | Positive | Negative. |
| Mercaptan content (wt. percent as S) | 0.001 | 0.012 | Less than .0004.[3] |

[1] ASTM D–130–56.
[2] ASTM D–484–52.
[3] Odor free.

The above data show that treatment of the JP–4 jet fuel in accordance with the present invention will result in a product which adequately satisfies the acceptable specifications for a marketable product.

Utilizing the solution as described, over 12,000 barrels of fuel were satisfactorily sweetened per 100 barrels of reagent without the necessity of regeneration of the treating solution.

EXAMPLE II

A portion of the same sour JP–4 jet fuel as used in Example I was treated in a conventional liquid "Merox" treatment utilizing a conventional "Merox" caustic solution consisting of an aqueous caustic solution containing 10.5 weight percent sodium hydroxide and 89.5 weight percent water having 50 p.p.m. by weight cobalt phthalocyanine disulfonate therein.

Examination of the resulting hydrocarbon effluent showed incomplete sweetening to have occurred. This was demonstrated by the analysis of the effluent which contained 0.005% mercaptan sulfur (weight percent), and .005 wt. percent mercaptan sulfur is in excess of specification maximum for JP–4, and was "Doctor" positive.

The term liquid "Merox" treatment as employed herein refers to the conventional process for sweetening hydrocarbons such as described in Petroleum Refiner, vol. 39, No. 9, September 1960, page 271, wherein an aqueous caustic solution containing cobalt phthalocyanine disulfonate therein and air are utilized.

EXAMPLE III

A portion of the same sour JP–4 jet fuel as used in Example I was treated in a conventional "Doctor" sweetening process under the same conditions and rates as described in Example I utilizing as the treating solution the "Doctor" solution of Example I, except there was no cobalt phthalocyanine disulfonate therein.

Examination of the product of this treatment showed that an acceptable product was obtained. However, only 1500 bbl. of hydrocarbon/100 bbl. reagent were capable of being treated prior to having to dump or regenerate the solution.

A comparison of the results obtained by operation in accordance with Examples I, II and III shows that treatment with the improved "Doctor's" solution (sodium plumbite) of the invention permitted treatment of over 12,000 barrels per 100 barrels of reagent of feedstock without the necessity of regeneration of the treating solution while use of an aqueous caustic solution containing cobalt phthalocyanine disulfonate failed to achieve satisfactory sweetening, and omission of the cobalt phthalocyanine disulfonate from the "Doctor's" solution permitted treatment of only 1500 barrels of feedstock per 100 barrels of solution prior to having to regenerate the solution.

Reasonable variations and modifications of this invention can be made, or followed, in view of the foregoing disclosure, without departing from the spirit or scope thereof.

We claim:
1. A process for the sweetening of sour JP–4 jet fuel which comprises contacting said sour JP–4 fuel with a treating agent consisting essentially of an aqueous solution of alkali metal plumbite having from 10 to 1000 parts per million of a phthalocyanine compound therein at a temperature in the range of 50 to 230° F., and wherein air is present in an amount in the range of 10 to 100 s.c.f. and added elemental sulfur is present in an amount in the range of 0.05 to 1 pound per pound of mercaptan sulfur in said sour JP–4 jet fuel.

2. A process according to claim 1 wherein said aqueous solution of an alkali metal plumbite is that formed by mixing 5 to 25 weight percent NaOH, 1 to 15 weight percent PbO and H₂O, and said phthalocyanine compound is cobalt phthalocyanine disulfonate.

References Cited

UNITED STATES PATENTS

| | | | |
|---|---|---|---|
| 2,871,187 | 1/1959 | Kalinowski | 208—199 |
| 2,882,224 | 4/1959 | Gleim et al. | 208—207 |
| 3,097,158 | 7/1963 | Gleim | 208—207 |
| 3,153,628 | 10/1964 | Moon | 208—199 |
| 3,247,089 | 4/1966 | Watson et al. | 208—199 |

OTHER REFERENCES

K. M. Brown, "Commercial Results With the UOP Merox Process for Mercaptan Extraction and Sweetening in the United States and Canada," Universal Oil Products Co. publication, Booklet 267 (1960), pp. 10 and 11.

DELBERT E. GANTZ, Primary Examiner

G. J. CRASANAKIS, Assistant Examiner

U.S. Cl. X.R.

208—206, 207